(12) United States Patent
Weber

(10) Patent No.: US 8,024,991 B2
(45) Date of Patent: Sep. 27, 2011

(54) ACTUATOR FOR SEAT ADJUSTING DEVICES

(75) Inventor: Stefan Weber, Lauf (DE)

(73) Assignee: Buehler Motor GmbH, Nuremberg (DE)

(*) Notice: Subject to any disclaimer, the term of this patent is extended or adjusted under 35 U.S.C. 154(b) by 1118 days.

(21) Appl. No.: 11/806,752

(22) Filed: Jun. 4, 2007

(65) Prior Publication Data

US 2007/0278832 A1 Dec. 6, 2007

(30) Foreign Application Priority Data

Jun. 3, 2006 (DE) .......................... 10 2006 026 100

(51) Int. Cl.
*F16C 1/10* (2006.01)
*F16H 57/02* (2006.01)
*F16H 57/04* (2006.01)
*F16H 61/00* (2006.01)

(52) U.S. Cl. ................ 74/500.5; 74/501.5 R; 74/502.4; 74/606 R; 297/378.12

(58) Field of Classification Search ................ 74/335, 74/500.5, 606 R, 501.5 R, 501.6, 502.4, 502.6; 297/378.12; 200/331; 180/65.1, 170, 315; 477/187; 623/63; 123/396; F16C 1/10
See application file for complete search history.

(56) References Cited

U.S. PATENT DOCUMENTS

| | | | | |
|---|---|---|---|---|
| 2,710,974 A | * | 6/1955 | Motis | ............................. 623/63 |
| 5,161,633 A | * | 11/1992 | Torrielli et al. | ............... 180/170 |
| 5,568,797 A | * | 10/1996 | Landerretche | ............... 123/396 |
| 7,093,686 B2 | * | 8/2006 | Cho | ............................. 180/315 |
| 7,556,315 B2 | * | 7/2009 | Nathan et al. | ............ 297/378.12 |
| 2002/0104695 A1 | * | 8/2002 | Sitarski et al. | ............... 180/65.1 |
| 2004/0259687 A1 | * | 12/2004 | Ritter et al. | .................... 477/187 |
| 2006/0278029 A1 | * | 12/2006 | Burgbacher | .................... 74/335 |
| 2009/0014302 A1 | * | 1/2009 | Meyer et al. | .................. 200/331 |

FOREIGN PATENT DOCUMENTS

DE 10230591 1/2004
WO WO 2006/039897 * 4/2006

* cited by examiner

*Primary Examiner* — Vinh T. Luong
(74) *Attorney, Agent, or Firm* — Jacobson Holman PLLC

(57) ABSTRACT

An actuator, especially for seat adjusting devices with at least one electrical engine having subordinated reduction gear and a disconnecting device for manual operation. The generic actuator is provided with a disconnecting device that can be used in all operating processes in a large number of different applications and that guarantees reliable functioning of the disconnecting device without being over-dimensioned and thus uneconomical. The disconnecting device has a coupling insertion spring which determines the release force of the disconnecting device and a reset spring is provided which resets an actuating device.

15 Claims, 4 Drawing Sheets

ACTUATOR FOR SEAT ADJUSTING DEVICES

BACKGROUND OF THE INVENTION (1) Field of the Invention

The invention is related to an actuator, especially for seat adjusting devices having at least one electric motor with a subordinate reduction gear and a disconnecting device for manual operation.

(2) Description of the Related Art

Electrical actuators are for comfort or adjustment of inaccessible adjusting links. In case of a voltage failure or other such defects, it should be possible to adjust the links manually; this is normally the case with seat elements too. As actuators usually have high-reduction, partly self-locking reduction gears, a manual adjustment to create the required torque is possible only with the help of a coupling between the electric motor and the reduction gear or within the reduction gear.

An actuator for seat adjustment devices is known from DE-OS 102 30 591, in which the drive path between an electric motor and an output means of the actuator can be interrupted manually, where a traction rope transfers the force of a manually activated lever to a disconnecting device, which blocks the gear ring of a planetary gear against rotation during the operation of the electric motor, but allows rotation in the manual mode.

FIG. 1 shows parts of an actuator 1 according to the state of the prior art, with a planetary gear 9 consisting of a sun gear 20 attached to a shaft 22, planet gears 21 that are mounted on a planet carrier (not shown) and a gear ring 5 that is simultaneously an integral part of a disconnecting device 4. The gear ring 5 has a coupling means 7 formed from a ring 17 on its peripheral side 6 as cutouts in which the counter-coupling means 8 intervenes on being impacted by a spring. The coupling means 7, 8 are mutually coordinated in such a way that a clearance-free coupling connection results in the coupled condition. The counter-coupling means 8 is a part of a swivel device 23 consisting of a coupling shaft 18, the ends of which are either integrated into one piece, or connected permanently to a traction lever 11 on one side and a counter-coupling means 8 on the other side. Together with one of these rotary bearings fixed to the housing, the coupling shaft 18 forms a swivel joint 15, where the swivel device 23 consisting of a coupling shaft 18, traction lever 11 and counter-coupling means 8 can swivel around a swivel axis 19. The coupling shaft 18 has a supporting means 24 facing the counter-coupling means 8 which is impacted by a coupling insertion spring 12 guided to an expansion mandrel 13 in such a way that the gear ring 5 of the planetary gear 9 is locked against rotation in the normal operation mode. The expansion mandrel 13 has a set base 14 that supports the coupling insertion spring 12 as a compression spring. The disconnecting device 4 can be disengaged manually over a Bowden control cable 10 (only indicated here).

FIG. 2 illustrates an actuator 1 according to the state of the prior art, having a housing 16 (displayed as opened) in which the following items are arranged: planetary gear 9 with the sun gear, planet gears, a planet carrier 25 and the gear ring 5, the coupling means 7 arranged on the peripheral side of the gear ring as a first component of the disconnecting device 4, the swivel device 23 consisting of the counter-coupling means 8, the coupling shaft 18 that is mounted in the housing 16 and the traction lever 11 that is in active connection with the Bowden control cable 10.

The Bowden control cable 10 that is held in place by a support 26 impacts the traction lever 11 and swivels the coupling shaft in the process and therefore, also the counter-coupling means 8 against the force of the coupling insertion spring 12 from the coupling means 7. To achieve zero clearance, coupling means 7 and counter-coupling means can be designed in the shape of a trapezium, so that the spring force of the coupling insertion spring 12 always takes care of adjacent coupling surfaces.

With the Bowden control cable not activated, the compression spring 12 holds the counter locking means 8 in its grip without any clearance with one of the latching means 7 and ensures that the gear ring 5 is quasi attached to the drive housing. This enables the operation of a customary actuator consisting of an electric motor and a reduction gear for setting an adjusting unit, e.g., a seat element, where the sun gear 20 drives the planet gears 21 interlocked with the gear ring 5 and therefore, the planet carrier that functions as the output of this gear level of the actuator. If the Bowden control cable is activated, the traction lever 11 swivels, and the counter-coupling means 8 connected via the coupling shaft 18 with the traction lever 11 around the swivel axis 19, where the counter-coupling means swivels away laterally from the coupling means 7. The swivel movement displaces the expansion mandrel 13 in its axial direction by the supporting means 24, which presses the compression spring 12 over the base 14, stretching it, so that an insertion movement of the counter coupling means with the Bowden control cable released takes place automatically. If necessary, the gear ring is locked only after activating the electric motor, as soon as the counter-coupling means 8 is brought in agreement with one of the coupling means 7.

In the disconnected condition, the gear ring 5 can be rotated freely in the housing. A reverse counter force from the adjusting unit can no longer be accepted by the gear ring 5 in this condition, hence the planet gears 21 roll during manual activation of the adjusting unit (e.g., seat element) and the planet carrier driven by it on the sun gear, and carry the gear ring along. The Bowden control cable enables or simplifies manual activation.

The known disconnecting device covers a single reset spring which tries to maintain the engaged position of the disconnecting device on the one hand, and resets the manually operated lever on the other hand. As such disconnecting devices are not designed for a single application for economical reasons, and it must be possible to adapt them to a large number of installation geometries, the disconnecting device must be designed to withstand all expected forces. Traction ropes have the unique property that the rope length protruding from a rope supporting system changes according to the number and amount of bending angles in the rope course. This longitudinal change leads to a partial disengagement of the disconnecting device so that under unfavorable conditions, the gear ring can be released without activating the manually operated lever, while it remains securely locked in other installation geometries. Moreover, the friction ratios of the traction rope can be influenced by different bending angles so that the insertion force which feeds the reset spring is not adequate in each and every case to ensure a safe insertion of the disconnecting device. In applications in which the traction rope of the Bowden control cable follows the movement of the adjustment, this factor can lead to situations in which the coupling disengages. This would make the actuator ineffective.

Hence, the task of the present invention is to provide a generic actuator with a disconnecting device that can be used for a large number of different applications and installation conditions and that guarantees a reliable function of the coupling device in all processes and methods without being over-dimensioned and therefore uneconomical.

BRIEF SUMMARY OF THE INVENTION

According to the invention, this problem is solved by the fact that the disconnecting device has a coupling insertion spring that defines the release force of the disconnecting device and that a reset spring is provided which resets an actuating means. An additional spring can be used to make the insertion movement of the disconnecting device and a resetting of the actuating means independent of each other, so that the insertion force of the coupling becomes independent of the use location and use type.

In a specially preferred design model of the invention, the actuating means is connected to the disconnecting device through a free movement device. This arrangement enables the following: the movements or arrangements of the Bowden control cable do not have any influence on the disconnecting device, especially on the coupling means. Thus, for instance, even if the Bowden control cable moves during the adjustment, no inadvertent undesirable interruptions are caused in the adjustment, because the clearance compensates any possible longitudinal change of the traction rope.

The invention envisages that the free movement device be designed as a free swivel device, where the free swivel device consists of a traction lever and a driver lever, both having a common swivel axis.

An especially simple structure is possible if a traction rope of a Bowden control cable is connected to a traction lever on the one hand and to an actuating means on the other hand, especially if the reset spring is guided through the traction rope of the Bowden control cable. This way the longitudinal axis of the reset spring too can describe an arc without limiting its effectiveness. In this arrangement, the reset spring is supported by the traction lever on one side and by a supporting surface fixed permanently to the housing on the other side.

Similarly as in the state of the art, it is provided in a design model of the invention that a counter-coupling means is mounted on a coupling means of the disconnecting device in swivel condition around the swivel axis. This arrangement is simple to implement and it allows a reliable operation of the disconnecting device. The swivel mounting of the counter-coupling means permits a large number of possible installation locations for the coupling insertion spring.

It is preferred that the coupling insertion spring be connected to a drive lever through a coupling shaft or to a one-piece supporting means, on one hand, and to a supporting surface attached permanently to the housing, on the other hand. The coupling insertion spring can be supported on an extension mandrel in this context. Alternatively, the coupling insertion spring can be supported on the drive lever on the one hand and on a supporting surface attached permanently to the housing on the other hand.

A compression spring, a spring clip or a spiral spring is ideally suited to function as the coupling insertion spring. A compression spring is preferably used for the reset spring.

BRIEF DESCRIPTION OF THE DRAWINGS

A design model of the invention is described in greater detail in the following pages with the help of the drawing. The following figures are displayed.

DETAILED DESCRIPTION OF THE INVENTION

Figure 1:
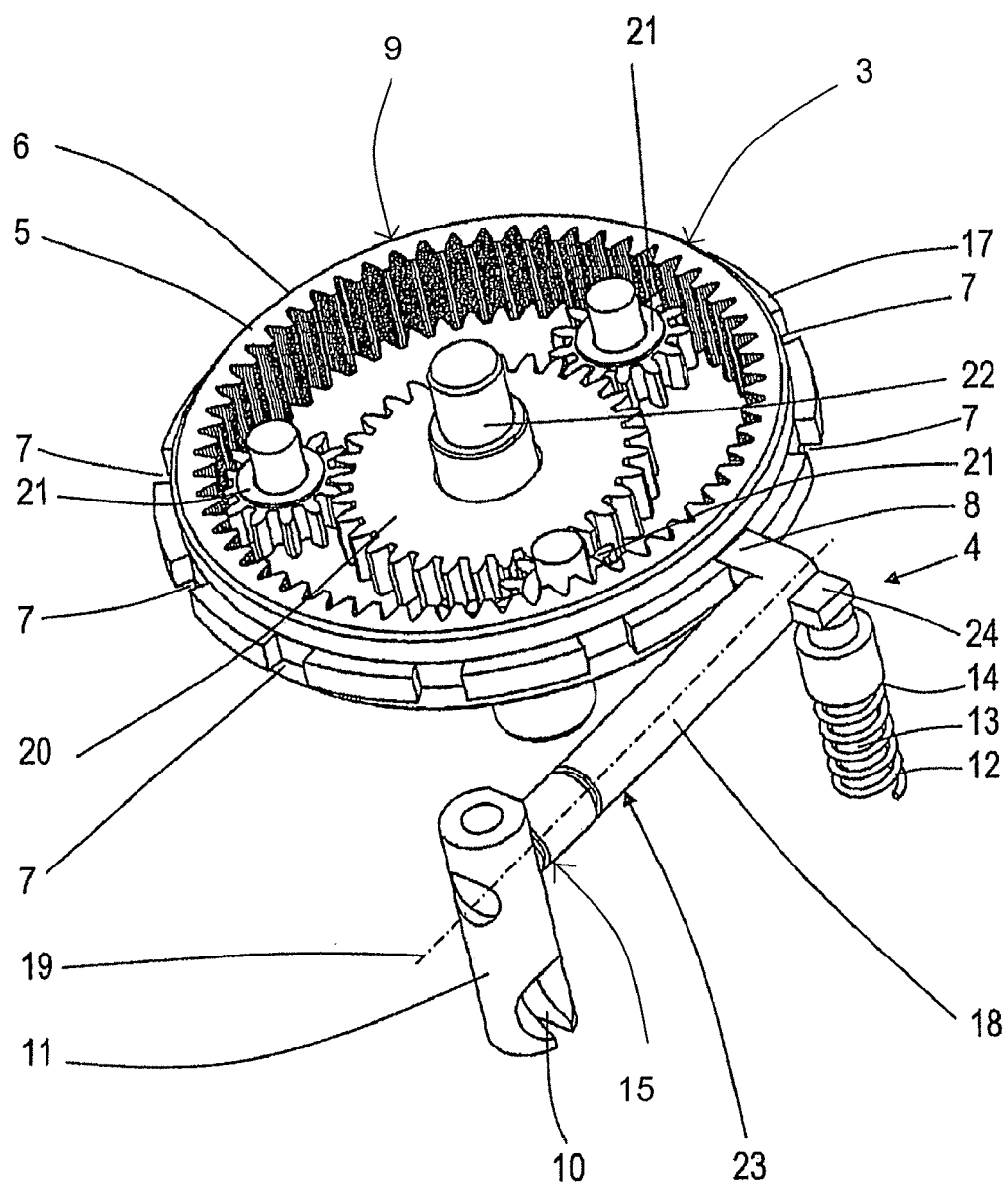
FIG. 1 is a perspective view of a disconnecting device according to the state of the prior art.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The protective scope of the invention is not limited to the displayed example, because it is possible to think in terms of a large number of alternative design models that also have different gear or coupling arrangements.

Figure 3A:
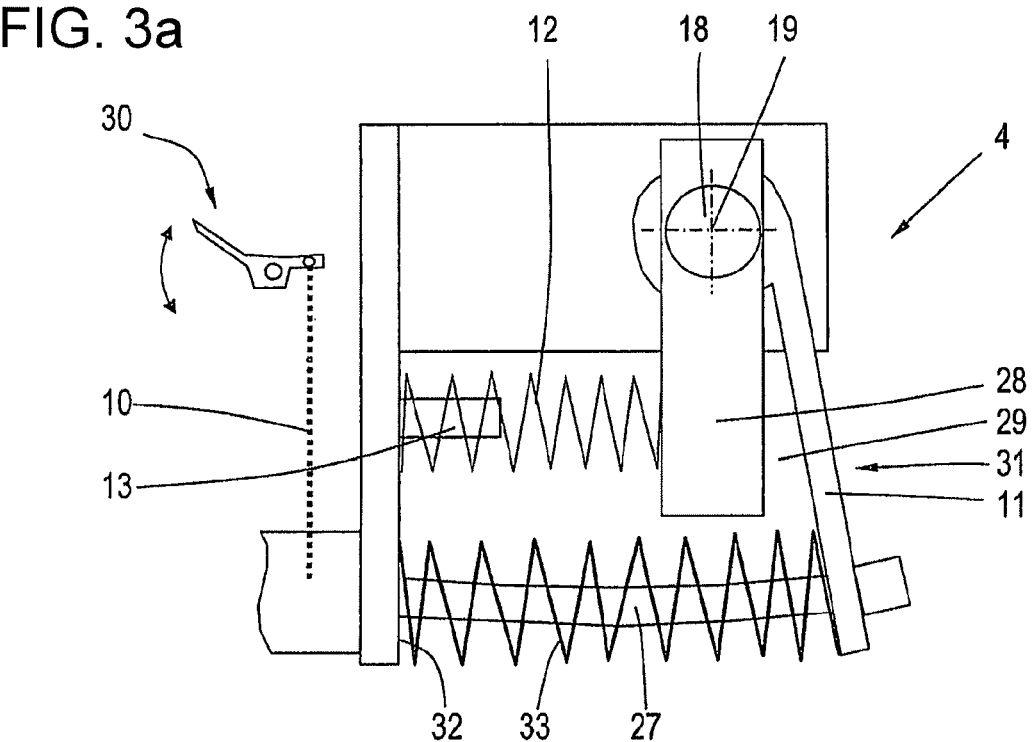
FIG. 3*a* is a schematic representation of a disconnecting device according to the invention, in a normal status.

FIG. 3*a* illustrates a schematic representation of a disconnecting device 4 according to the invention in a normal operation condition in which an actuating means 30 is in its normal position and the coupling that can be designed according to the state of the art, is locked. The actuating means 30 is connected to a traction lever 11 through a traction rope 27 of a Bowden control cable 10, where the traction lever 11 is in a non-working position through a reset spring 33 that is guided from the traction rope 27. The traction lever 11 is mounted on a coupling shaft 18 of the disconnecting device 4 around a swivel axis 19, so that it can swivel. A drive lever 28 is stiffly fixed on the coupling shaft 18. The coupling shaft 18 is mounted around the swivel axis 19 with the help of the drive lever 28 in such a way that it can swivel. The bearing positions (not shown here) are located in a housing of the actuator. The traction lever 11 can be swiveled against the drive lever 28.

FIG. 3*a* also shows a clearance 29 between traction lever 11 and drive lever 28, which enables a limited free movement of the traction lever 11 without changing the insertion condition of coupling means 7, 8 of the disconnecting device 4. A coupling insertion spring 12 supported on an expansion mandrel 13 works on the drive lever 28. The coupling insertion spring is supported by a supporting surface 32 attached to the housing. The actuating means 30 is designed here in the form of a manually operated lever. In case of use in a seat adjustment device, the actuating means is arranged, e.g., in the top area of the backrest, so that a seat backrest adjustment may be possible manually in case of a power failure.

Figure 3B:
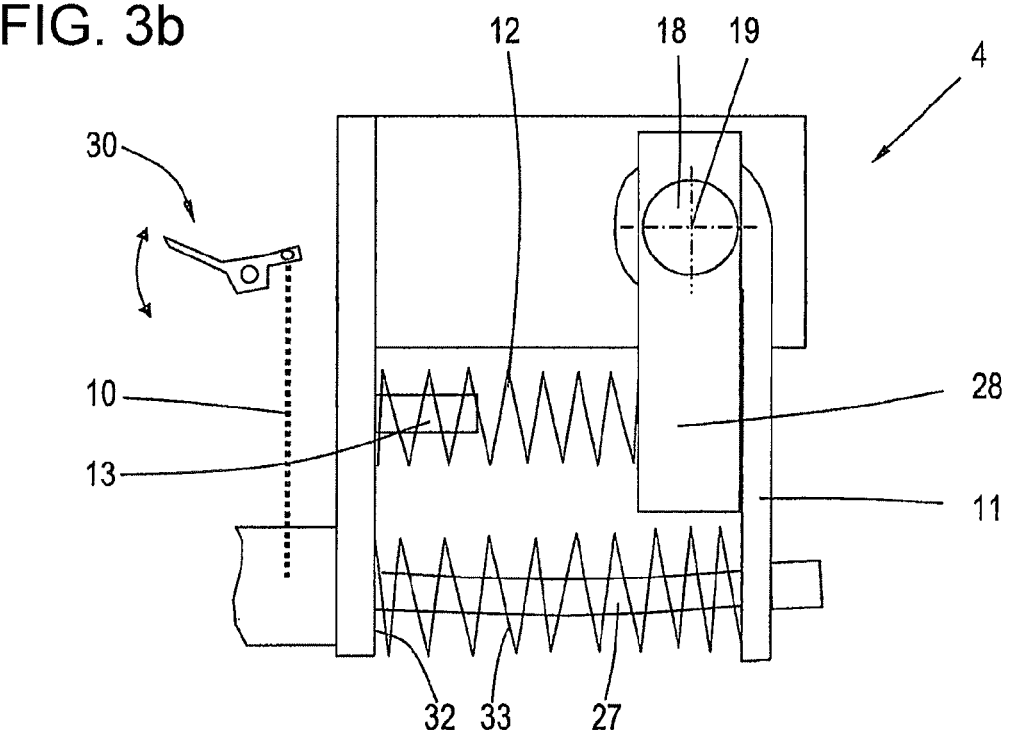
FIG. 3*b* is a schematic representation of the disconnecting device according to the invention, in an intermediate status.

FIG. 3*b* is a schematic representation of the disconnecting device according to the invention in the intermediate position in which the clearance 29 from FIG. 3*a* is overcome and the dead movement clearance is removed from the arrangement. On activating the actuating means 30 further, the drive lever 28 also moves and with it the counter-coupling means 8, as is known from DE 102 30 591 A1, starts disconnecting from the coupling means 7.

Figure 2:
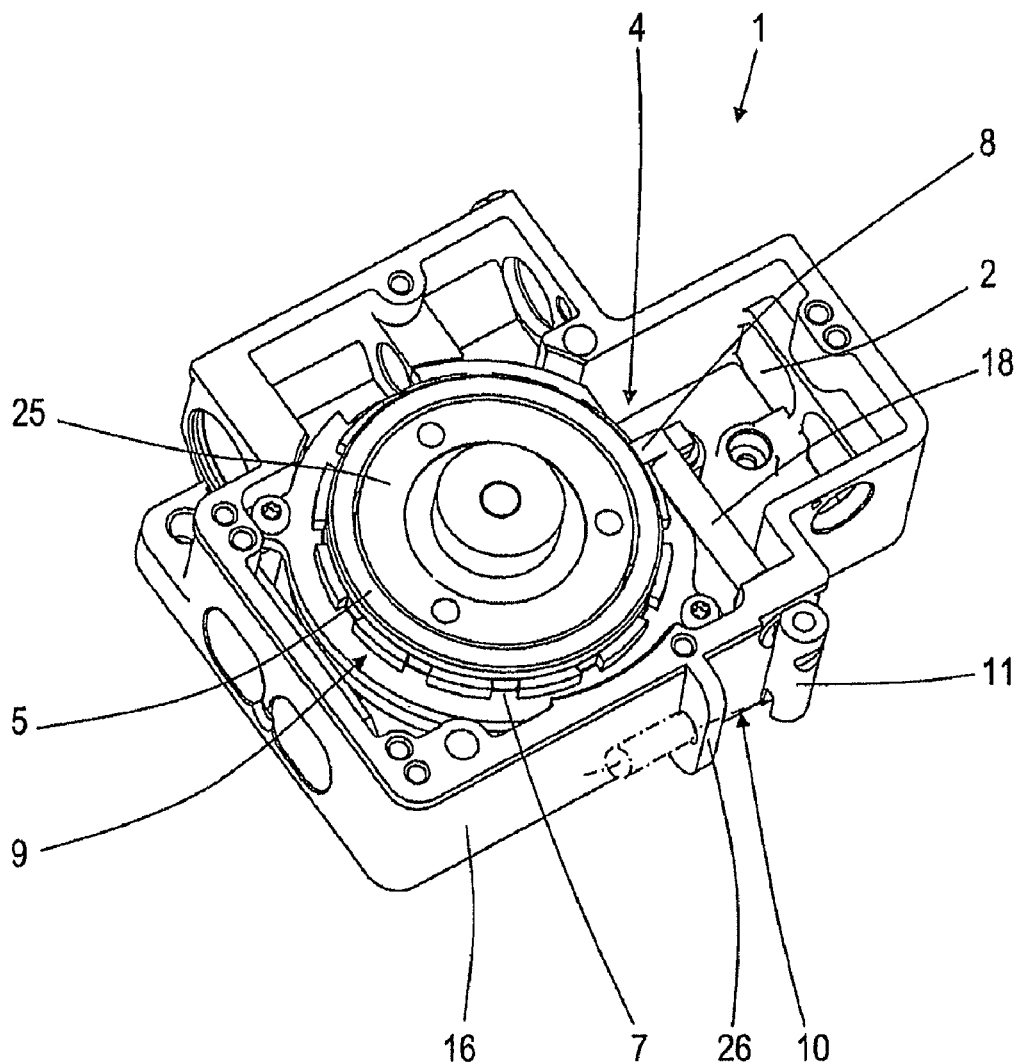
FIG. 2 is a perspective view of an actuator with a corresponding disconnecting device according to the state of the prior art.
Figure 3C:
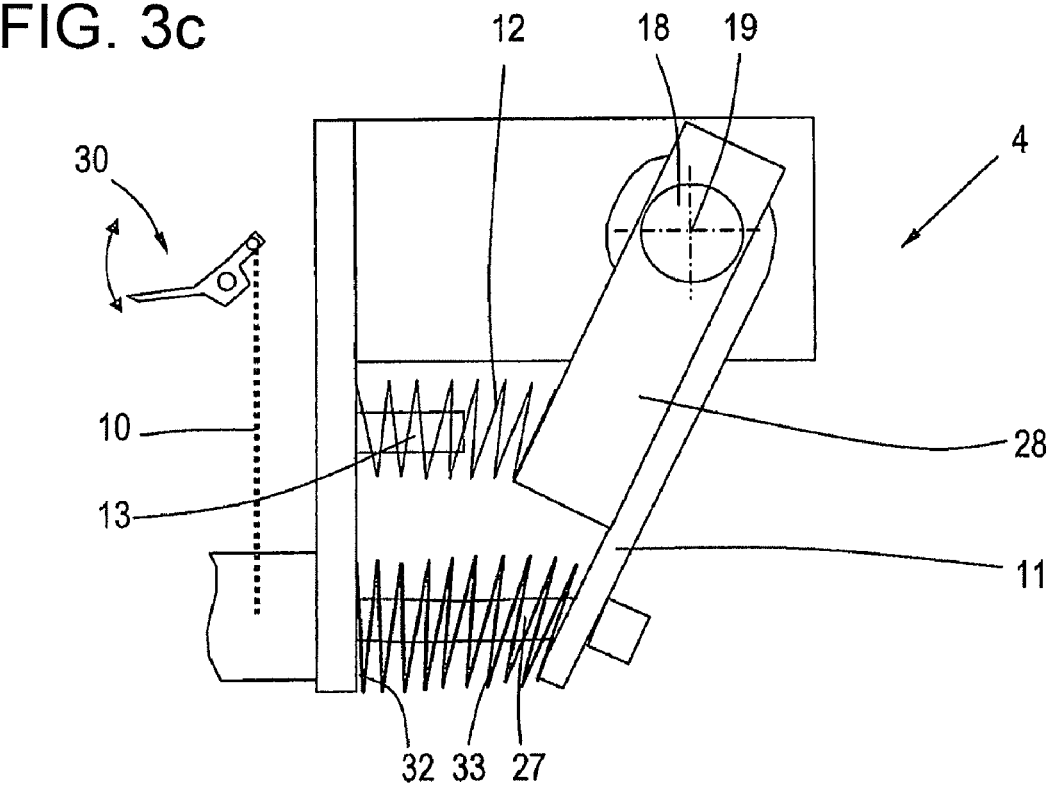
FIG. 3*c* is a schematic representation of the disconnecting device according to the invention, in a disengaged condition and with drawn actuating means.

This movement is continued till the end status of FIG. 3*c* is reached, in which the actuating means 30 is fully activated and the disconnecting operation is completed. In this condition, the element to be activated, i.e., a back support of an automobile or airplane seat can be brought to the desired position through manual adjustment. In the given example from DE 102 30 591 A1 (referring to FIG. 1 and FIG. 2), the gear ring moves during the manual adjustment to an intermediate position or incidentally in a locking position. If the actuating means 30 is allowed to go to an intermediate position, the status as illustrated in FIG. 3d is maintained.

Figure 3D:
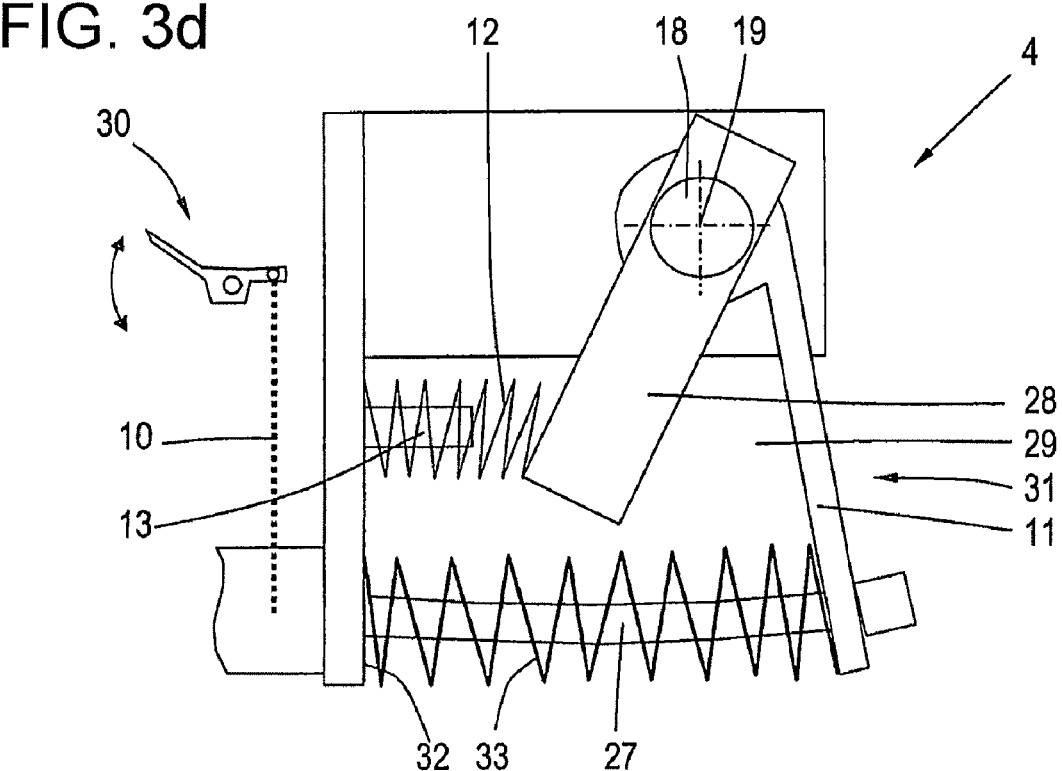
FIG. 3*d* is a schematic representation of the disconnecting device according to the invention, in a disconnected condition and with reset actuating means.

The coupling is disengaged in FIG. 3d, where the drive lever 28 waits in an extreme position till the motor is activated again and it effects a synchronization of the coupling while the traction lever 11 was returned to its normal position by the reset spring 33. The clearance 29 is now bigger than in the normal condition. During the synchronization however, the movement of the driver lever 28 is limited by the lock 7, 8 (FIG. 1), so that the drive lever 28 is then reset to a position according to FIG. 3a by the coupling insertion spring 12.

The schematic representation illustrates only one of the several possible variants. The arrangement and type of the coupling insertion spring 12 and the reset spring 33 can vary. It is also possible to use a linear movement device in place of the swivel device to release the coupling on the one hand and to represent a clearance between a traction means and a driver means on the other hand. Additionally, Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS

1 Actuator
2 Electrical engine
3 Reduction gear
4 Disconnecting device
5 Gear element (gear ring)
6 Peripheral side
7 Coupling means
8 Counter-coupling means
9 Planetary gear
10 Bowden control cable
11 Traction lever
12 Coupling insertion spring
13 Expansion mandrel
14 Base
15 Swivel joint
16 Housing
17 Ring
18 Coupling shaft
19 Swivel axis
20 Sun gear
21 Planet gear
22 Shaft
23 Swivel device
24 Supporting means
25 Planet carrier
26 Support
27 Traction rope
28 Drive lever
29 Clearance
30 Actuating means
31 Free movement device
32 Supporting surface
33 Reset spring

The invention claimed is:

1. An actuator for a seat adjusting device with at least one electric motor having subordinate reduction gear and a disconnecting device for manual operation, the actuator comprising:
   a coupling insertion spring forming part of the disconnecting device, the coupling insertion spring determining the release force of the disconnecting device;
   a reset spring for resetting an actuating device;
   a drive lever; and
   a supporting surface fixed to a housing, wherein the coupling insertion spring is supported on the drive lever and on the supporting surface fixed to the housing.

2. The actuator according to claim 1, wherein the coupling insertion spring is a compression spring.

3. The actuator according to claim 1, wherein the reset spring is a compression spring.

4. An actuator for a seat adjusting device with at least one electric motor having subordinate reduction gear and a disconnecting device for manual operation, the actuator comprising:
   a coupling insertion spring forming part of the disconnecting device, the coupling insertion spring determining the release force of the disconnecting device;
   a reset spring for resetting an actuating device;
   a free movement device for operatively connecting the actuating device to the disconnecting device,
      wherein the free movement device is a free swivel device consisting of a traction lever and a drive lever, and
      wherein the traction lever and the drive lever are mounted to swivel around a common swivel axis;
   a reset spring for resetting an actuating device,
   a free swivel device for operatively connecting the actuating device to the disconnecting device, the free swivel consisting of a traction lever and a drive lever, both levers being mounted so that both levels can swivel around a common axis;
   a Bowden control cable having a traction rope; and
   a connector connecting the traction rope to the traction lever and the actuating device; wherein the reset spring is guided through the traction rope of the Bowden control cable.

5. The actuator according to claim 4, further comprising:
   coupling means forming part of the disconnecting device; and
   counter-coupling means mounted around the swivel axis so that counter-coupling means can swivel.

6. The actuator according to claim 5, wherein the coupling means and the counter-coupling means have a corresponding relationship with each other.

7. The actuator according to claim 4,
   wherein the coupling insertion spring is supported on the drive lever and on the supporting surface fixed to the housing.

8. The actuator according to claim 4, wherein the coupling insertion spring is a compression spring.

9. The actuator according to claim 4, wherein the reset spring is a compression spring.

10. An actuator for a seat adjusting device with at least one electric motor having subordinate reduction gear and a disconnecting device for manual operation, the actuator comprising:
    a coupling insertion spring forming part of the disconnecting device, the coupling insertion spring determining the release force of the disconnecting device;
    a reset spring for resetting an actuating device;

a free movement device for operatively connecting the actuating device to the disconnecting device,
wherein the free movement device is a free swivel device consisting of a traction lever and a drive lever, and
wherein the traction lever and the drive lever are mounted to swivel around a common swivel axis;
a reset spring for resetting an actuating device,
a free swivel device for operatively connecting the actuating device to the disconnecting device, the free swivel consisting of a traction lever and a drive lever, both levers being mounted so that both levels can swivel around a common axis;
a Bowden control cable having a traction rope;
a connector connecting the traction rope to the traction lever and the actuating device; and
a housing having a supporting surface, and wherein the reset spring is supported on the traction lever and on the supporting surface on the housing.

11. The actuator according to claim 10, further comprising:
coupling means forming part of the disconnecting device; and
counter-coupling means mounted around the swivel axis so that counter-coupling means can swivel.

12. The actuator according to claim 11, wherein the coupling means and the counter-coupling means have a corresponding relationship with each other.

13. The actuator according to claim 10, wherein the coupling insertion spring is supported on the drive lever and on the supporting surface fixed to the housing.

14. The actuator according to claim 10, wherein the coupling insertion spring is a compression spring.

15. The actuator according to claim 10, wherein the reset spring is a compression spring.

* * * * *